(12) United States Patent
Tang et al.

(10) Patent No.: US 7,742,251 B2
(45) Date of Patent: Jun. 22, 2010

(54) TIMING INSENSITIVE METHOD AND APPARATUS FOR SPECTRAL ANALYSIS IN A DISK RECORDING SYSTEM

(75) Inventors: Yawshing Tang, Saratoga, CA (US);
Carl Xiaodong Che, Saratoga, CA (US);
Na-Young Kim, San Jose, CA (US)

(73) Assignee: Samsung Electronics Co., Ltd., Suwon (KR)

(*) Notice: Subject to any disclaimer, the term of this patent is extended or adjusted under 35 U.S.C. 154(b) by 157 days.

(21) Appl. No.: 12/150,810

(22) Filed: Apr. 30, 2008

(65) Prior Publication Data

US 2009/0273856 A1 Nov. 5, 2009

(51) Int. Cl.
*G11B 5/09* (2006.01)
(52) U.S. Cl. .......................................... 360/39
(58) Field of Classification Search ........................ None
See application file for complete search history.

(56) References Cited

U.S. PATENT DOCUMENTS

| | | |
|---|---|---|
| 5,784,296 A | 7/1998 | Baker et al. |
| 6,671,111 B2 * | 12/2003 | Ottesen et al. .................. 360/31 |
| 7,027,239 B2 * | 4/2006 | Priester et al. .................. 360/6 |

* cited by examiner

*Primary Examiner*—Daniell L Negrón
(74) *Attorney, Agent, or Firm*—Ben J. Yorks; Irell & Manella LLP

(57) ABSTRACT

A hard disk drive that includes a disk that contains at least one signal and a head that is coupled to the disk. The disk drive also contains a circuit that includes a data sampler that generates a plurality of data samples from the signal, a harmonic sensor coupled to the data sampler and a spectral power accumulator coupled to the harmonic sensor. The harmonic sensor accumulates the data samples. The circuit includes a window generator that determines a window length of the data samples accumulated by the harmonic sensor. The spectral power accumulator accumulates the windows of sample data accumulated by the harmonic sensor. The sample data accumulated by the spectral power accumulator can be accessed by a processor that performs a spectral analysis of the data.

13 Claims, 3 Drawing Sheets

TIMING INSENSITIVE METHOD AND APPARATUS FOR SPECTRAL ANALYSIS IN A DISK RECORDING SYSTEM

BACKGROUND OF THE INVENTION

1. Field of the Invention

The present invention relates to performing a spectral analysis of a signal in a hard disk drive.

2. Background Information

Hard disk drives contain a plurality of magnetic heads that are coupled to rotating disks. The heads write and read information by magnetizing and sensing the magnetic fields of the disk surfaces. Data is written by applying a current to a write element of the heads. The write current is set in accordance with various parameters such as overshoot duration. Likewise a read element has a defined bias voltage that is set at an optimal value.

The heads are separated from the disk surfaces by air bearings. The air bearings minimize contact between the heads and disks to reduce component wear. The air bearings are described in terms of a flying height. The magnetic field strength is inversely proportional to the flying height. An increase in flying height will cause a decrease in the magnetic field sensed or used to write information on the disk.

It has been found that analyzing the read signal to determine harmonics at specific frequencies can be useful in determining and optimizing certain operating parameters such as the write current, bias voltage and flying height control. By way of example, U.S. Pat. No. 5,784,296 issued to Baker et al. describes a harmonic sensor that is used to accumulate sampled data taken from a read signal of a disk drive. A spectral analysis is then performed on the accumulated sampled data to determine various harmonics at certain signal frequencies. The effective bandwidth of the harmonic sensor becomes very narrow when there are long sample sequences. The sensor becomes more sensitive to sample frequency when accumulating long sample lengths. Such sensitivity can lead to errors if the samples are not taken at the correct time.

BRIEF SUMMARY OF THE INVENTION

A hard disk drive that includes a disk that contains at least one signal and a head that is coupled to the disk. The disk drive also contains a circuit that includes a data sampler that generates a plurality of data samples from the signal, a harmonic sensor coupled to the data sampler and a spectral power accumulator coupled to the harmonic sensor. The harmonic sensor accumulates the data samples. The circuit includes a window generator that determines a window length of the data samples accumulated by the harmonic sensor.

DETAILED DESCRIPTION

Disclosed is a hard disk drive that includes a disk that contains at least one signal and a head that is coupled to the disk. The disk drive also contains a circuit that includes a data sampler that generates a plurality of data samples from the signal, a harmonic sensor coupled to the data sampler and a spectral power accumulator coupled to the harmonic sensor. The harmonic sensor accumulates the data samples. The circuit includes a window generator that determines a window length of the data samples accumulated by the harmonic sensor. The spectral power accumulator accumulates the windows of sample data accumulated by the harmonic sensor. The sample data accumulated by the spectral power accumulator can be accessed by a processor that performs a spectral analysis of the data.

Figure 1:
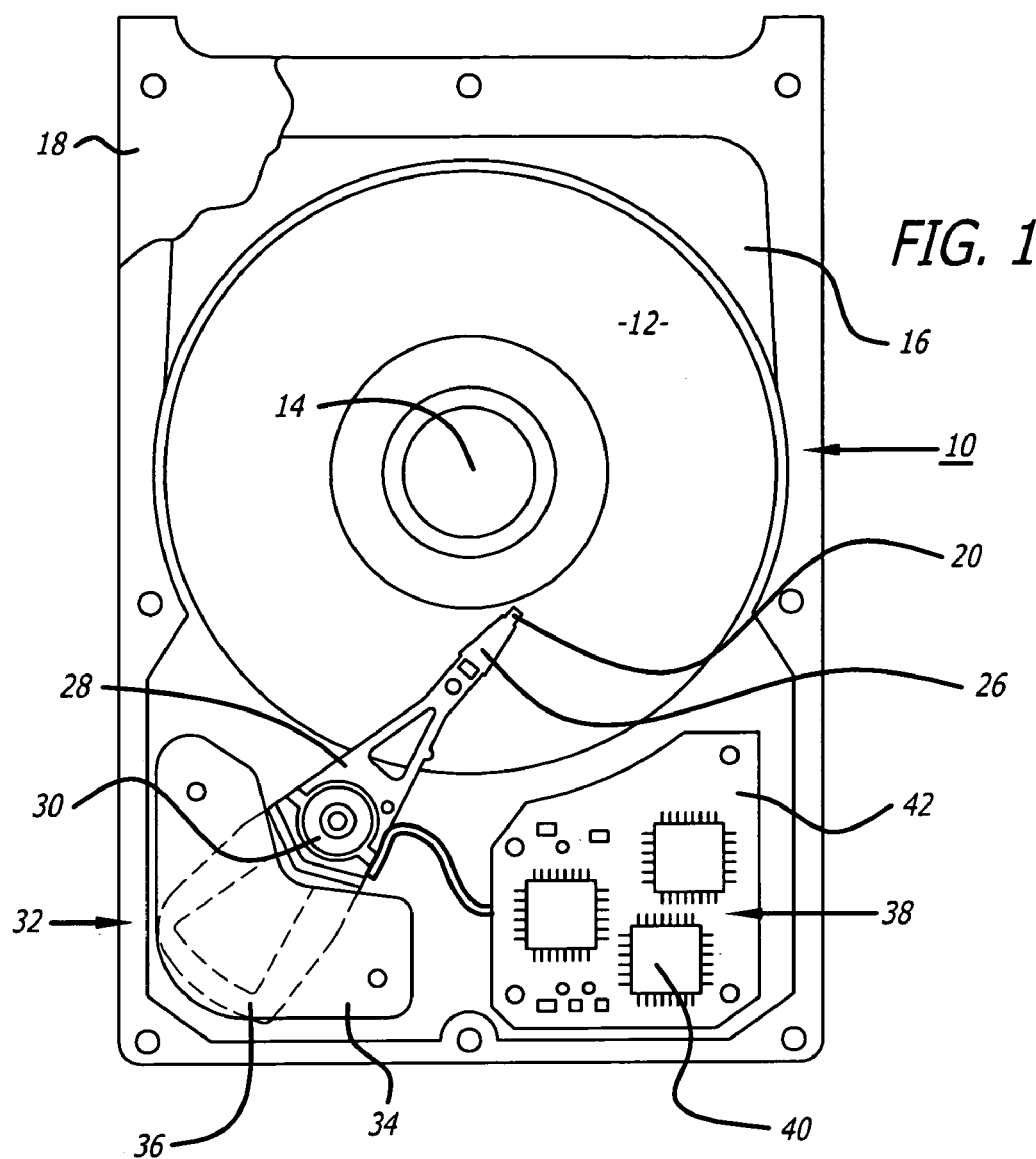
FIG. 1 is a top view of an embodiment of a hard disk drive.

Referring to the drawings more particularly by reference numbers, FIG. 1 shows an embodiment of a hard disk drive 10 of the present invention. The disk drive 10 may include one or more magnetic disks 12 that are rotated by a spindle motor 14. The spindle motor 14 may be mounted to a base plate 16. The disk drive 10 may further have a cover 18 that encloses the disks 12.

Figure 2:
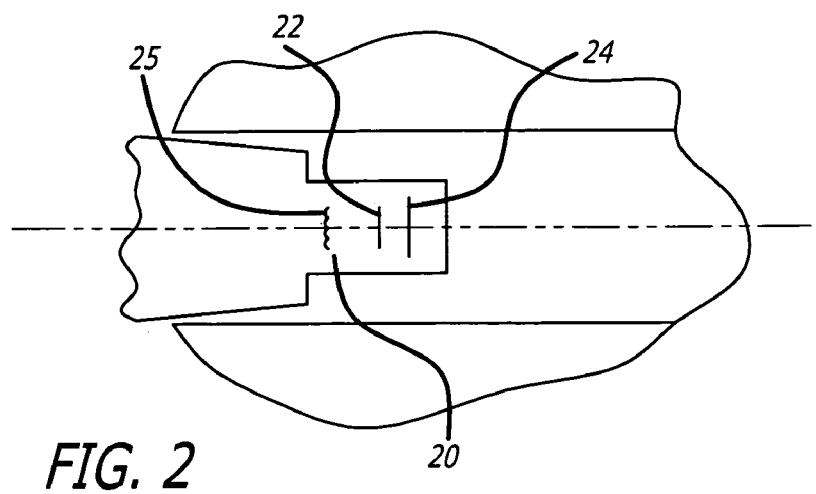
FIG. 2 is a top enlarged view of a head of the hard disk drive.

The disk drive 10 may include a plurality of heads 20 located adjacent to the disks 12. As shown in FIG. 2 the heads 20 may have separate write 22 and read elements 24. The write element 22 magnetizes the disk 12 to write data. The read element 24 senses the magnetic fields of the disks 12 to read data. By way of example, the read element 24 may be constructed from a magneto-resistive material that has a resistance which varies linearly with changes in magnetic flux. The head 20 may be a perpendicular recording head. The head 20 may also include a heater element (not shown). Such heads are commonly referred to as fly on demand ("FOD") heads.

Referring to FIG. 1, each head 20 may be gimbal mounted to a flexure arm 26 as part of a head gimbal assembly (HGA). The flexure arms 26 are attached to an actuator arm 28 that is pivotally mounted to the base plate 16 by a bearing assembly 30. A voice coil 32 is attached to the actuator arm 28. The voice coil 32 is coupled to a magnet assembly 34 to create a voice coil motor (VCM) 36. Providing a current to the voice coil 32 will create a torque that swings the actuator arm 28 and moves the heads 20 across the disks 12.

The hard disk drive 10 may include a printed circuit board assembly 38 that includes a plurality of integrated circuits 40 coupled to a printed circuit board 42. The printed circuit board 40 is coupled to the voice coil 32, heads 20 and spindle motor 14 by wires (not shown).

Figure 3:
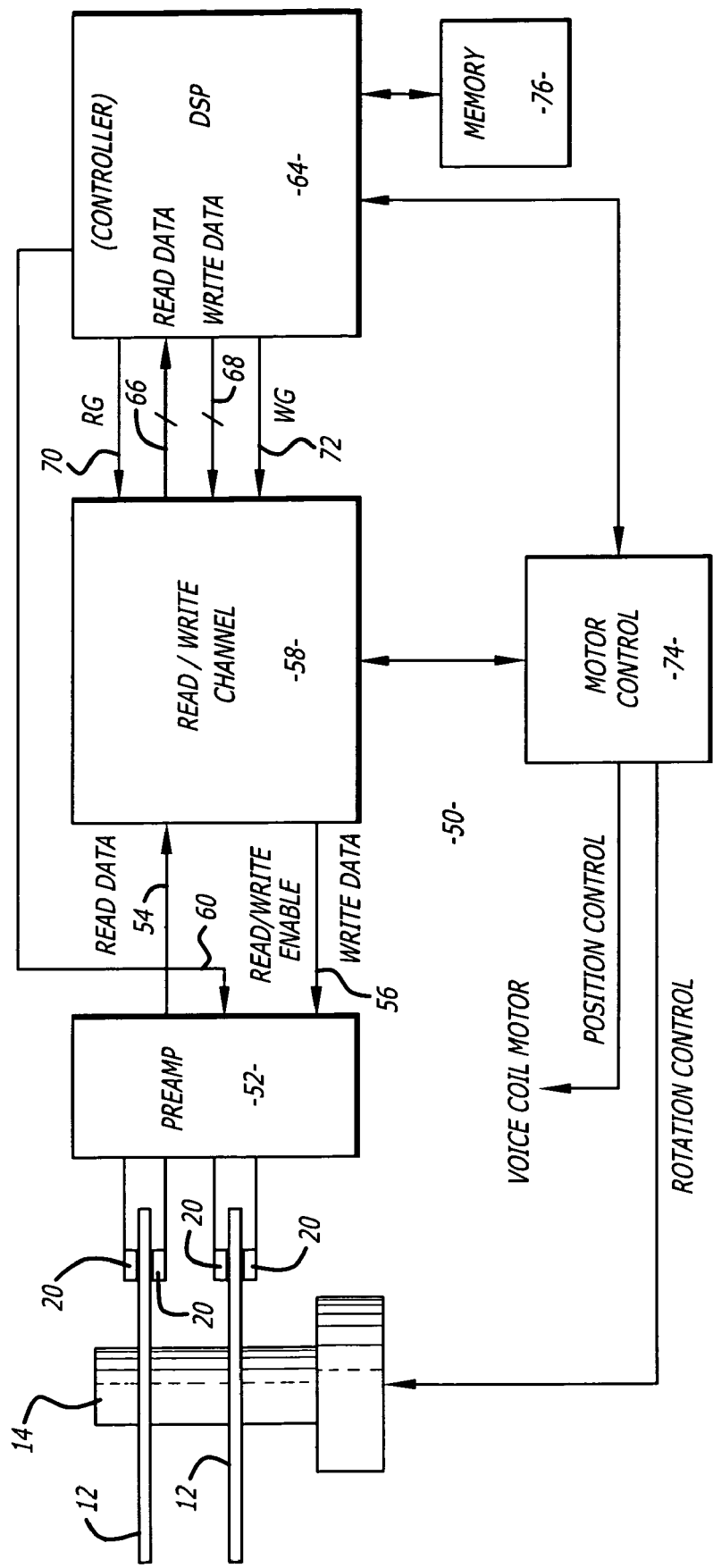
FIG. 3 is a schematic of an electrical circuit for the hard disk drive.

FIG. 3 shows an electrical circuit 50 for reading and writing data onto the disks 12. The circuit 50 may include a pre-amplifier circuit 52 that is coupled to the heads 20. The pre-amplifier circuit 52 has a read data channel 54 and a write data channel 56 that are connected to a read/write channel circuit 58. The pre-amplifier 52 also has a read/write enable gate 60 connected to a controller 64. Data can be written onto the disks 12, or read from the disks 12 by enabling the read/write enable gate 60.

The read/write channel circuit 58 is connected to a controller 64 through read and write channels 66 and 68, respectively, and read and write gates 70 and 72, respectively. The read gate 70 is enabled when data is to be read from the disks 12. The write gate 72 is to be enabled when writing data to the disks 12. The controller 64 may be a digital signal processor that operates in accordance with a software routine, including a routine(s) to write and read data from the disks 12. The read/write channel circuit 62 and controller 64 may also be connected to a motor control circuit 74 which controls the voice coil motor 36 and spindle motor 14 of the disk drive 10. The controller 64 may be connected to a non-volatile memory device 76. By way of example, the device 76 may be a read only memory ("ROM"). The non-volatile memory 76 may contain the instructions to operate the controller and disk drive. Alternatively, the controller may have embedded firmware to operate the drive.

Figure 4:
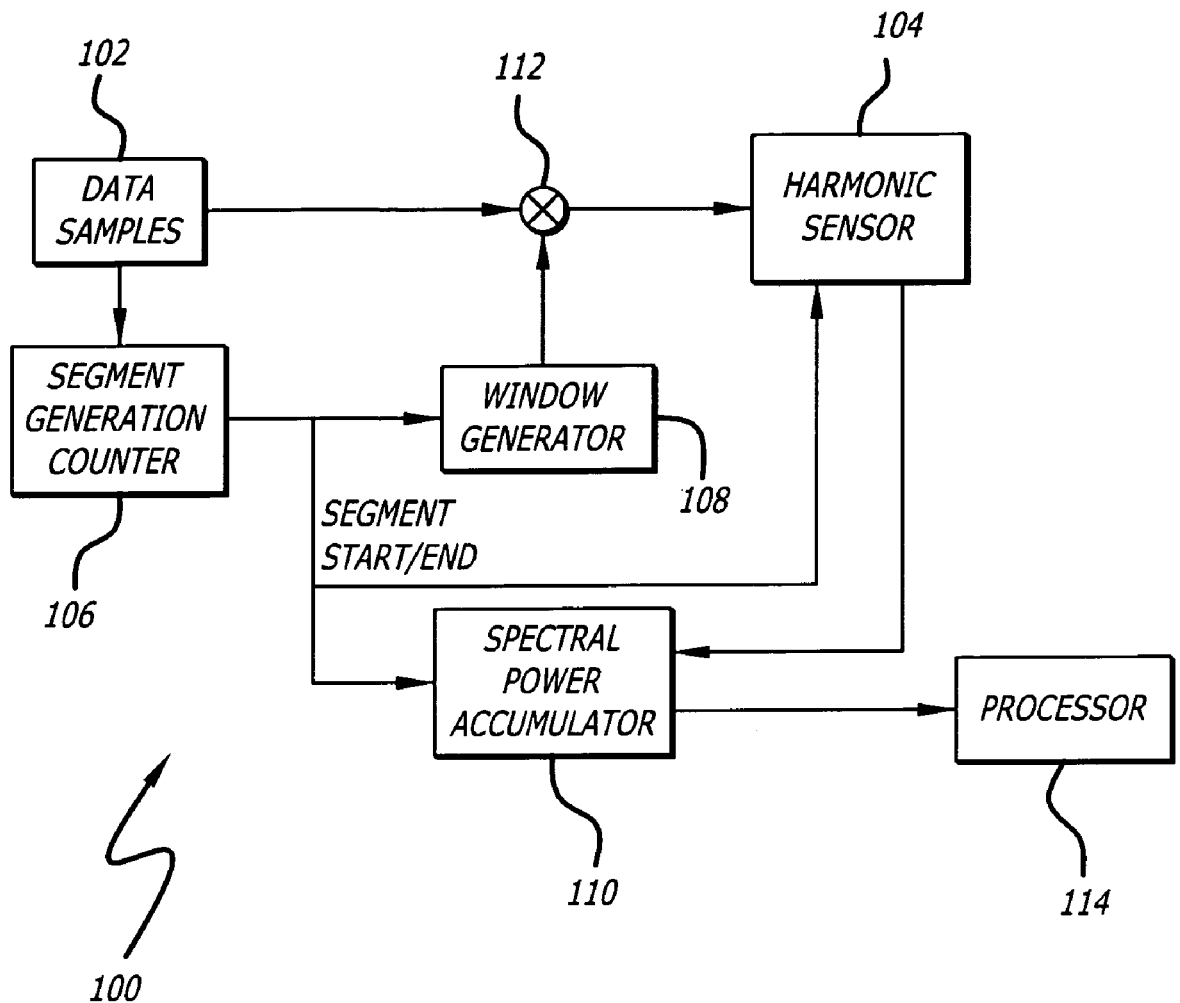
FIG. 4 is a schematic showing function blocks of a circuit that accumulates sampled data for spectral analysis.

FIG. 4 is a schematic of a circuit 100 that can accumulate data for spectral analysis. The circuit 100 includes a data sampler 102 that can generates data samples from a signal read from a disk 12. The data sampler 102 can include an analog to digital converter that converts the analog read signal into a series of digital bits. The data samples are passed to a harmonic sensor 104. The harmonic sensor 104 can generate an accumulation of data samples. The harmonic sensor 104 may be similar to the sensor described in U.S. Pat. No. 5,784, 296 issued to Baker et al., which is hereby incorporated by reference.

The circuit 100 includes a counter 106 that is connected to a window generator 108, a spectral power accumulator 110 and the harmonic sensor 104. The window generator 108 is connected to an adder 112.

In operation, the creation of data samples triggers the counter 106 to initiate a count. The counter 106 also generates a segment START signal that is provided to the window generator 108 and harmonic sensor 104. The window generator 108 provides a weight value for each data sample. The multiplier 112 multiplies the weight values by the data samples. The product is provided to the harmonic sensor 104. The harmonic sensor 104 accumulates the sampled data.

The counter 106 counts until it reaches a predetermined value. By way of example, the segment or window size may be 128 samples. Upon reaching "128" the counter 106 generates a segment END signal that is provided to the window generator 108, harmonic sensor 104 and spectral power accumulator 110. The contents of the harmonic sensor 104 are transferred to the accumulator 110. When the data sampler 102 generates the next sample, the counter 106 begins counting again and provides a new segment START signal to the window generator 108 and harmonic sensor 106. This START signal resets the generator 108 and sensor 106 and the process is repeated. The spectral power accumulator 110 periodically accumulates the data samples accumulated by the harmonic sensor 106 for each window and computes the spectral power. A processor core 114 can retrieve the sampled data accumulated by the accumulator 110 for spectral analysis of the spectral power.

The circuit 100 allows large sequences of data samples to be accumulated without the bandwidth and sampling frequency sensitivity issues found in the prior art. The count of the counter 106 can be variable so that different window lengths can be employed by the circuit 100.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

For example, multiple circuits 100 may be employed to create overlapping data sample segments.

What is claimed is:

1. A hard disk drive, comprising:
    a disk that contains at least one signal;
    a head that is coupled to said disk;
    a circuit that includes;
        a data sampler that generates a plurality of data samples from said signal;
        a harmonic sensor that is coupled to said data sampler and accumulates said data samples;
        a window generator that determines a window length of data samples accumulated by said harmonic sensor, and generates a weight value that is multiplied with said data samples generated by said data sampler before accumulation by said harmonic sensor; and,
        a spectral power accumulator coupled to said harmonic sensor.

2. The disk drive of claim 1, further comprising a counter coupled to said harmonic sensor, said window generator and said spectral power accumulator.

3. The disk drive of claim 1, wherein said window length of said data samples is variable.

4. The disk drive of claim 1, further comprising a processor coupled to said spectral power accumulator.

5. A hard disk drive, comprising:
    a disk that contains at least one signal;
    a head that is coupled to said disk;
    a circuit that includes;
        data sample means for generating a plurality of data samples from said signal;
        harmonic sensor means for accumulating said data samples;
        window means for determining a window length of data samples accumulated by said harmonic sensor means, and generating a weight value that is multiplied with said data samples generated by said data sample means before accumulation by said harmonic sensor means; and,
        spectral power accumulator means for accumulating windows of data samples accumulated by said harmonic sensor means.

6. The disk drive of claim 5, wherein said window means includes a counter coupled to said harmonic sensor means and said spectral power accumulator means.

7. The disk drive of claim 5, wherein said window length of said data samples is variable.

8. The disk drive of claim 5, further comprising a processor for processing data accumulated in said spectral power accumulator means.

9. A method for accumulating data samples from a signal from a disk of a hard disk drive, comprising:
    a) reading a signal from a disk;
    b) sampling the signal to generate a plurality of data samples;
    c) generating a weight value for each data sample;
    d) multiplying each weight value with each corresponding data sample;
    e) providing a window length of data samples to a harmonic sensor;
    f) accumulating the window length of data samples within the harmonic sensor; and,
    g) accumulating windows of data samples accumulated by the harmonic sensor.

10. The method of claim 9, wherein the window length is established by a counter.

11. The method of claim 9, further comprising varying the window length.

12. The method of claim 9, further comprising repeating steps a) through g).

13. The method of claim 12, further comprising analyzing at least one harmonic attribute of the signal from the accumulated windows of data samples.

* * * * *